INVENTOR.
CORNELIUS SAVIN
BY Kenneth S. Goldfarb
ATTORNEY

Sept. 11, 1962  C. SAVIN  3,053,145
LIGHT PROJECTOR
Filed Sept. 11, 1959  2 Sheets-Sheet 2
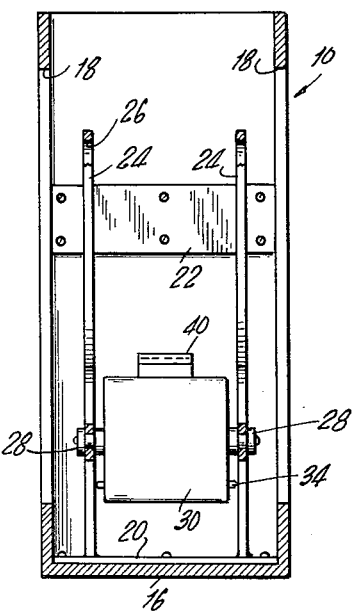
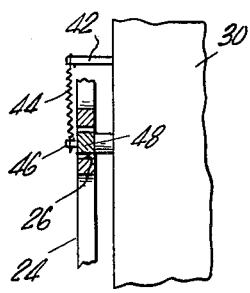
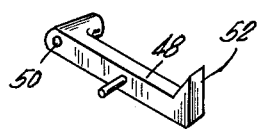
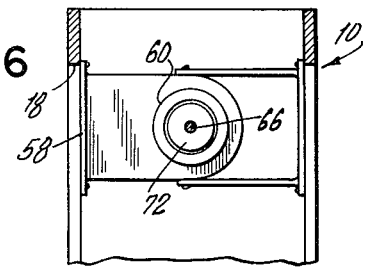
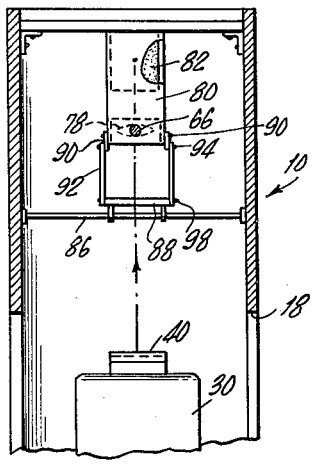
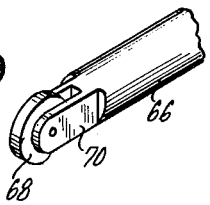
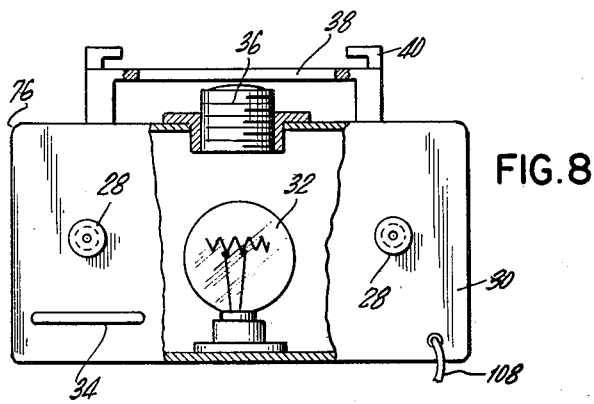
INVENTOR.
CORNELIUS SAVIN
BY Kenneth S. Goldfarb
ATTORNEY

United States Patent Office 3,053,145
Patented Sept. 11, 1962

3,053,145
LIGHT PROJECTOR
Cornelius Savin, 634 Hickory St., Westbury, N.Y.
Filed Sept. 11, 1959, Ser. No. 839,476
5 Claims. (Cl. 88—26)

This invention relates to the class of optical devices and more particularly to a dual position projector. The projector comprising the present invention is especially adapted for use in projecting on a screen images of slides used for educational and instructional purposes.

Certain slides used as educational devices for instruction in engineering subjects such as mechanics and physics and which may employ the force of gravity to illustrate the function of various moving parts of the slide must employ a projector wherein the slide is arranged in a vertical position. On the other hand, certain slides must be mounted horizontally in order that gravity does not distort the function of the parts.

Further, it is very often necessary to successively employ slides which require different positions. It is, therefore one of the important objects of the present invention to provide a projector which facilitates the projection of images of slides without requiring a manual adjustment of the lenses, mirrors and like optical equipment used in transmitting and reflecting the images out of the housing of the projector.

The cost of projectors is usually comparatively high due to the fact that heat resistant and optically effective lenses, mirrors and the like must be employed, together with a light source. Heretofore, it has been necessary to employ two separate projectors, thus requiring double the amount of optical equipment, in order to successively project slides requiring vertical positioning and slides requiring horizontal positioning.

It is therefore another important object of the invention to provide a projector which requires only a single light source and a single set of optical equipment to achieve its desired functions.

An additional object of the invention resides in the provision of a mechanical arrangement in a slide projector which will automatically position the various component optical elements of the invention so that the focal length of the optical equipment will remain the same even through the light ray projection assembly is moved from a first position to a second position normal thereto.

Still further objects and features of this invention reside in the provision of a projector that is simple in construction, efficient in operation, attractive in appearance, sturdy though light in weight, substantially fool-proof in operation, and relatively inexpensive to manufacture. These, together with the various ancillary objects and features of the invention which will become apparent as the following description proceeds are attained by this projector, an embodiment being shown in the accompanying drawings by way of example only, wherein:

FIG. 3 is a transverse sectional view of the projector taken along the planes of line 3—3 of FIG. 1.

FIG. 4 is a sectional detailed view of the locking means utilized for holding the light ray projection assembly in its selected position;

FIG. 5 is a perspective view of the latch employed in the arrangement shown in FIG. 4;

FIG. 6 is an enlarged sectional detailed view taken along the plane of line 6—6 of FIG. 1;

FIG. 7 is an enlarged vertical sectional detailed view illustrating more particularly arrangement of certain of the optical elements employed in the invention;

FIG. 8 is an enlarged detailed view illustrating the component parts of the light ray projection assembly; and FIG. 9 is a partial perspective view on an enlarged scale of the push rod forming one of the mechanical means for positioning the optical elements.

Figure 1:
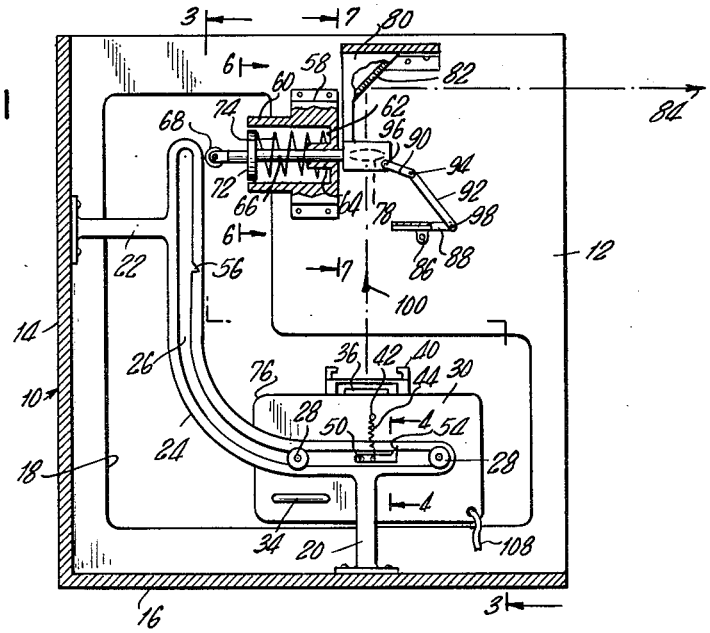
FIG. 1 is a vertical sectional view of the projector comprising the present invention illustrating the component parts arranged in a first position adapted to receiving a slide in a horizontal position.

With continuing reference to the accompanying drawings wherein like reference numerals designate similar parts throughout the various figures, reference numeral 10 designates a housing of any particular shape, size and configuration and which, as shown, is provided with side walls 12, a rear wall 14, and a bottom 16. The side wall 12 has openings 18 of suitable size and configuration formed therein so that access may be had to the interior of the projector in a convenient manner whereby slides may be easily placed in the projector and removed therefrom.

By means of brackets 20 and 22 secured to the bottom 16 and rear wall 14 respectively, a trackway comprising two tracks 24 is mounted in the housing 10. Each of the tracks is substantially the same shape and configuration and is provided with a central slot 26 adapted to receive rollers 28 therein which rollers are affixed to a casing 30.

The tracks 24 are substantially L-shaped though they are provided with an arcuate portion along the connection between the vertical and horizontal portion of the track.

The casing 30 has mounted therein a light source 32 comprising a low-heat generating, low-temperature, high-illumination lamp. Suitable openings 34 for heat transfer are of course provided in the casing 30. Adjustably mounted in the casing is a lens forming a condenser 36 for directing light rays from the lamp 32 through any sort of a slide such as indicated by 38 which is removably positioned in the slide holder 40 which forms the means for positioning the slide. The slide holder 40 may be of any suitable size and construction adapted for the purpose of supporting the type of slides being employed, and it is being contemplated that various types of adaptors will be employed for use in showing different types or sizes of slides.

A pin 42, see FIG. 4, is fixed to the casing 30 and one end of a spring 44 is attached thereto. The other end of the spring is attached to a projection 46 on a latch 48 which is pivoted as at 50 to the casing 30. The latch has a triangular detent portion which is adapted to fit in recesses 54 and 56 formed in at least one of the tracks 24, it being recognized that two latches 48 may be employed if desired.

Fixed to the side wall 12 is a bracket 58 which carries a cylinder 60 and which is provided with an end wall 62 and a cylindrical guide 64. A push rod 66 is guidably and movably positioned in the cylindrical guide 64 and as can best be seen in FIG. 9 has a roller 68 rotatably mounted in the bifurcated free end 70 thereof. Fixed to the push rod 66 is a disc 72, and a coil spring 74 is disposed in and yieldably engages disc 72 and end wall 62.

The push rod is engageable with the outer surface of the casing 30 which is preferably provided with a rounded or cam-shaped corner 76. Hence, upon movement of the casing from the position as shown in FIG. 1 to the position of FIG. 2 the spring 74 will be compressed upon engagement of the roller 68 with the outer surface of the casing 30.

Mounted on the push rod 66 is a lens 78 which may be either adjustable or fixedly positioned. Attached to the lens 78 and moveable therewith is a mirror mounting assembly 80 including a mirror 82 arranged at an angle of 45° to the vertical so that light passing upwards through the lens 78 will be reflected in the direction of the arrow 84 out of the housing 10. Pivoted to the wall 12 on a shaft 86 is a mirror 88. Links 90 and 92 are pivoted to each other as at 94 and link 90 is attached to lens 78 as at 96, while link 92 is attached to the mirror as at 98.

Figure 2:
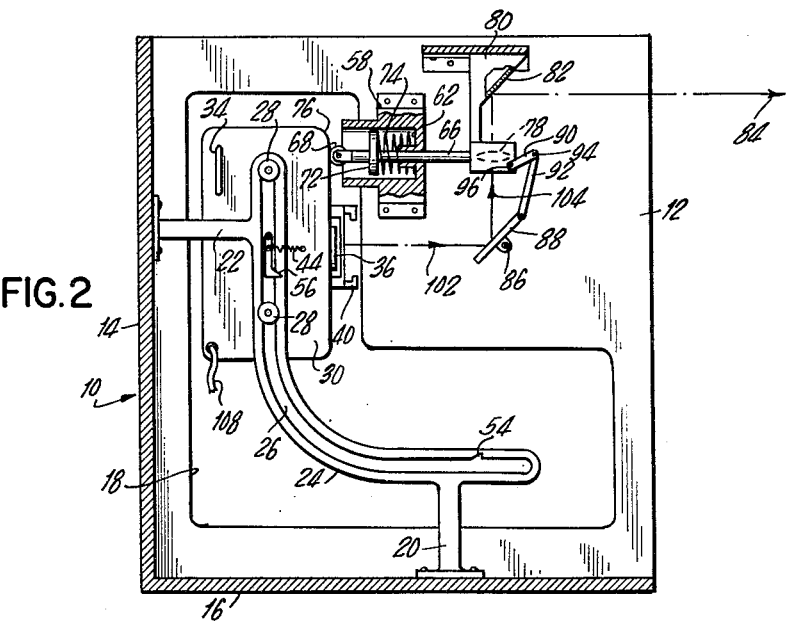
FIG. 2 is a vertical sectional view similar to FIG. 1 but illustrating the invention with the component parts in the second position.

Hence translation or movement of the lens 78 will cause the mirror to pivot from its horizontal position as shown in FIG. 1 to its position at an angle of 45° to the horizontal as shown in FIG. 2, with the mirror being in alignment with the lens 78.

One of the special and important features of the invention is that the distance from the slide holder 40 and the condenser 36 to the lens 78 is exactly the same whether the casing 30 is in the position as shown in FIG. 1 or as shown in FIG. 2. More particularly, it is noted that the cumulative distance that the light rays must travel from the condenser to mirror 88 as indicated by arrow 102, from whence it is reflected to the lens as indicated by arrow 104, is exactly equal to the path of the light shown by arrow 100 in FIG. 1.

Obviously lamp 32 is connected through suitable conductors 107 to a source of electrical power and suitable switches not shown, may be provided for controlling the flow of electrical power to the light source.

In operation, and with the invention in the position as shown in FIG. 1, a slide is placed in a horizontal position in the slide holder 40 with the condenser 36 and lens 78 adjusted as needed. When the image of the slide becomes distinct on the screen, the projector is ready for continued use.

Subsequent slides may be successively placed in the slide holder 40. These slides are of the type that can be provided with new parts for illustrating mechanical theories and other physical phenomena. Should it, however, be desired to project on the screen an image of a slide which must be arranged in vertical position, the entire casing, which can be provided with a handle, not shown, which projects out of the housing 10, may be moved to the position shown in FIG. 2. The latch 48 is either manually released or is automatically cammed by its triangular shape out of the latched position. The casing is moved until it engages the roller 68 of the push rod 66, moving the push rod 66 to the position shown in FIG. 2. The lens 78 is simultaneously translated to the position shown in FIG. 1, and links 92 and 94 pivot the mirror 88. The mirror 88 may be provided with a counter-weight, or may be of such size and weight that it will act as a counter-weight whereby the energy necessary to move the casing 30 will be minimized.

In the position shown in FIG. 2 light rays passing through the vertically arranged slide in the slide holder will be reflected by the mirror, pass through the lens 78 and will be reflected by the mirror 82 in the direction of the arrow 84 out of the projector 10.

Since from the foregoing, numerous modifications and equivalents will readily occur to those skilled in the art, it is not intended to limit the invention to the precise embodiment shown and described, but all suitable modifications may readily be resorted to which fall within the scope of the appended claims.

I claim:
1. A projector comprising a housing, a curved trackway having two leg portions in said housing, a light ray projection assembly including a source of light, a condenser, and means for supporting a slide, lens means movably mounted in said housing, guide means on said assembly engaging said trackway, positioning means carried by said assembly for lockingly holding said assembly in a first selected position and in a second selected position normal to said first selected position, a spring pressed push rod connected to said lens, said push rod having a roller on an end thereof, said assembly engaging said roller for moving said lens from one position to another position as said assembly is moved from its first position to its second position so that light rays emanating from said light source and passing through said condenser will pass through said lens means, and a mirror fixedly secured to said lens means and movable therewith for reflecting light rays passing through said lens means.

2. A projector comprising a housing, a curved trackway having two leg portions in said housing, a light ray projection assembly including a source of light, a condenser, and means for supporting a slide, lens means movably mounted in said housing, guide means on said assembly engaging said trackway, positioning means carried by said assembly for lockingly holding said assembly in a first selected position and in a second selected position normal to said first selected position, a spring pressed push rod connected to said lens, said push rod having a roller on an end thereof, said assembly engaging said roller for moving said lens from one position to another position as said assembly is moved from its first position to its second position so that light rays emanating from said light source and passing through said condenser will pass through said lens means, a mirror fixedly secured to said lens means and movable therewith for reflecting light rays passing through said lens means out of said housing, a second mirror pivoted to said housing, and link means pivoted to said lens and said second mirror for pivoting said mirror from a first inactive position to a second position upon movement of said lens means from said one position to said other position, said second mirror reflecting light rays from said condenser into said lens means in said second position.

3. The projector of claim 2 wherein said assembly includes a casing, said source of light being disposed in said casing, said means for supporting a slide being mounted on said casing.

4. The projector of claim 2 wherein said assembly includes a casing, said source of light being disposed in said casing, said means for supporting a slide being mounted on said casing, said guide means including rollers attached to said casing, said rollers being in rolling engagement with said trackway.

5. A projector comprising a housing, a light ray projection assembly including a source of light, a condenser and means for supporting a slide, lens means mounted in said housing, said lens means having an axis in alignment with said condenser in said projector assembly in a first predetermined position and out of alignment with said condenser in a second predetermined position, positioning means for guidably moving and holding said assembly in and from a first selected position to and in a second predetermined position normal to said first position, means in said housing coacting with movement of the projector assembly for moving said lens from one position to another upon corresponding movement of said assembly so that light rays emanating from said light source and passing through said condenser will pass through said lens means, a mirror fixedly secured to said lens means and moveable therewith for reflecting light rays passing through said lens means out of said housing, a second mirror pivoted to said housing, and link means pivoted to said lens and said second mirror for pivoting said second mirror from a first position out of alignment with said axis to a second position in alignment with said axis upon movement of said lens means, said second mirror reflecting light rays from said condenser into said lens means in said second position.

References Cited in the file of this patent
UNITED STATES PATENTS

| | | |
|---|---|---|
| 1,097,013 | Genter | May 19, 1914 |
| 2,081,329 | Gordon | May 27, 1937 |
| 2,204,709 | Straubel et al. | June 18, 1940 |
| 2,909,652 | Pratt | Oct. 20, 1959 |